(12) United States Patent
Yamamoto et al.

(10) Patent No.: US 8,368,651 B2
(45) Date of Patent: Feb. 5, 2013

(54) INPUT DEVICE

(75) Inventors: Tamotsu Yamamoto, Hyogo (JP); Shinichi Takasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/598,606

(22) PCT Filed: Feb. 18, 2009

(86) PCT No.: PCT/JP2009/000650
§ 371 (c)(1),
(2), (4) Date: Nov. 3, 2009

(87) PCT Pub. No.: WO2009/113243
PCT Pub. Date: Sep. 17, 2009

(65) Prior Publication Data
US 2011/0134041 A1    Jun. 9, 2011

(30) Foreign Application Priority Data

Mar. 12, 2008 (JP) ................ 2008-062165
Apr. 17, 2008 (JP) ................ 2008-107660

(51) Int. Cl.
G06F 3/033    (2006.01)

(52) U.S. Cl. ......... 345/167; 345/157; 345/163; 345/164
(58) Field of Classification Search ............... None
See application file for complete search history.

(56) References Cited

U.S. PATENT DOCUMENTS

| 7,323,959 | B2 * | 1/2008 | Naka et al. ............ 335/205 |
| 2004/0023694 | A1 | 2/2004 | Mori et al. |
| 2006/0109249 | A1 * | 5/2006 | Lin et al. ............ 345/167 |
| 2006/0208840 | A1 * | 9/2006 | Naka et al. ............ 335/207 |
| 2007/0080946 | A1 * | 4/2007 | Fyke et al. ............ 345/167 |

FOREIGN PATENT DOCUMENTS

| JP | 2001-507839 A | 6/2001 |
| JP | 2002-140160 A | 5/2002 |
| JP | 2002-290518 A | 10/2002 |

(Continued)

OTHER PUBLICATIONS

Japanese Office Action for Application No. 2008-062165, May 10, 2011, Panasonic Corporation, p. 1.

(Continued)

*Primary Examiner* — Muhammad N Edun
(74) *Attorney, Agent, or Firm* — RatnerPrestia (57) ABSTRACT

An input device includes a case, a ball, a magnetic detecting element, a wiring board, and a rocking part. The ball is rotatably accommodated in the case, exposed from an opening of the case, and is embedded with a magnetic substance having a plurality of protrusions or with a plurality of magnets. In a case the magnetic substance is embedded in the ball, a magnet is placed where its magnetism affects the plurality of protrusions. The magnetic detecting element is disposed facing the ball with a certain gap. The switch is mounted on the wiring board. The rocking part is placed between the case and the switch, supporting the case in a swingable manner with respect to the switch. The switch is turned on and off corresponding to a rocking motion of the rocking part. The ball and the magnetic detecting element are attached to the rocking part so that the gap is kept constant with each other when the rocking part rocks.

6 Claims, 6 Drawing Sheets

FOREIGN PATENT DOCUMENTS

| | | |
|---|---|---|
| JP | 2004-5091 A | 1/2004 |
| JP | 2004-005091 A | 1/2004 |
| JP | 2004-164286 A | 6/2004 |
| JP | 2005-141339 A | 6/2005 |
| WO | WO 98/30971 | 7/1998 |

OTHER PUBLICATIONS

Japanese Office Action for Application No. 2008-062165, Aug. 2, 2011, Panasonic Corporation, p. 1.
International Search Report for PCT/JP2009/000650, Apr. 7, 2009.

* cited by examiner

INPUT DEVICE

This application is a U.S. National Phase Application of PCT International Application PCT/JP2009/000650.

TECHNICAL FIELD

This invention relates an input device to be used for operating various electronic devices.

BACKGROUND ART

Figure 7:
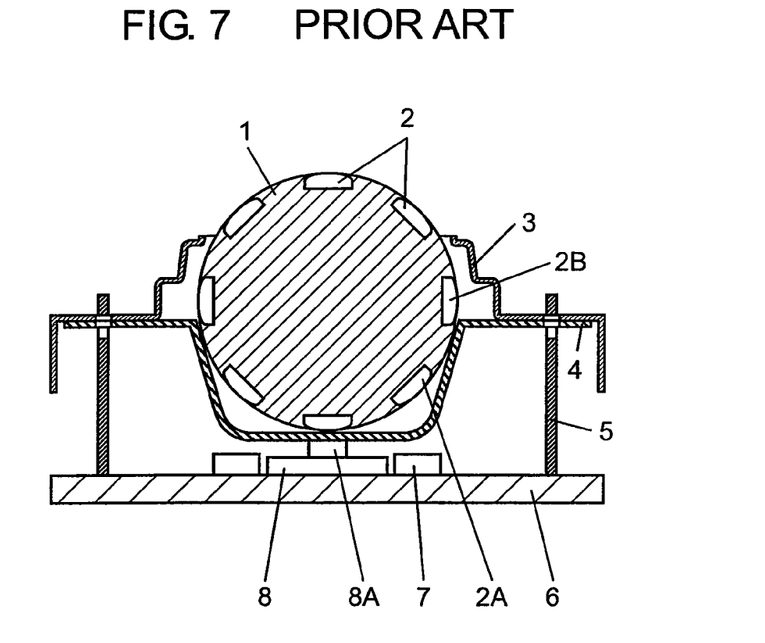
FIG. 7 is a cross sectional view of a conventional input device.
Figure 8:
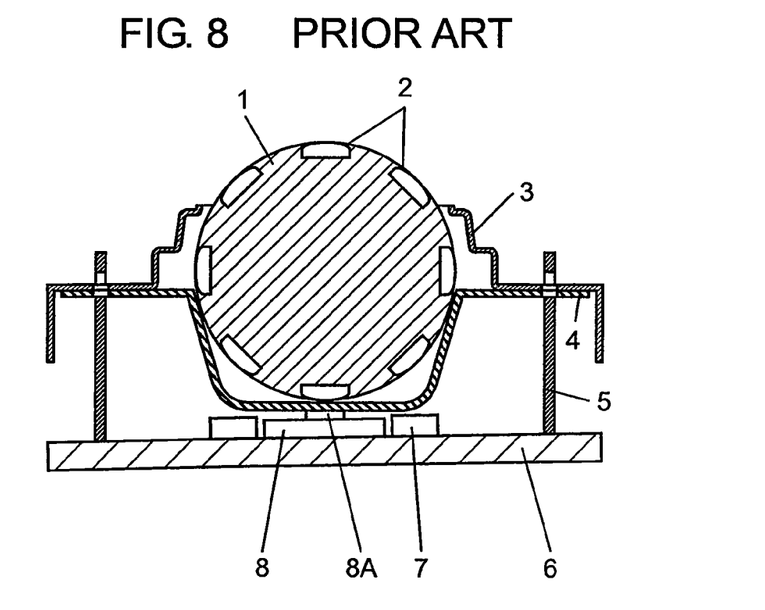
FIG. 8 is a cross sectional view of the press-operated input device shown in FIG. 7.

In recent years, various kinds of electronic devices including a mobile phone and a personal computer are progressively having a high performance and being miniaturized. With this trend, an input device for operating these electronic devices is required to have a good operational feeling and a reliable operability. A conventional type of this kind input device is explained using FIGS. 7 and 8. FIGS. 7 and 8 are cross sectional views of the conventional input device, and FIG. 8 shows a status the input device being press-operated. The input device has ball 1 made of insulating resin, upper case 3, lower case 4, frame 5, and wiring board 6.

A plurality of magnets 2 which is made of ferrite or the like and formed in substantially a disk shape is embedded in an outer periphery of ball 1 with a certain space therebetween. Upper case 3, lower case 4, and frame 5 are made of a thin metal plate. Upper case 3 and lower case 4 are attached to frame 5 movably in up and down directions. Within upper case 3 and lower case 4, ball 1 is rotatably accommodated, and an upper part of ball 1 is protruded from an opening in an upper side of case 3.

A plurality of wiring patterns (not shown) are formed on upper and lower sides of wiring board 6, and a plurality of magnetic detecting elements 7 such as a hall element are mounted on the upper side of wiring board 6. A lower end of frame 5 is fixed to wiring board 6. Magnetic detecting elements 7 are placed facing ball 1 with a certain gap.

On the upper side of wiring board 6, push switch 8 (hereinafter, switch) is mounted. Switch 8 is placed under ball 1. Switch 8 has push button 8A protruded upward. An upper face of push button 8A is in contact with a bottom face of lower case 4.

Thus constituted input device is installed in an operational part of electronic devices (not illustrated) such as a mobile phone and a personal computer. When installed, the upper part of ball 1 is protruded from the operational part. Magnetic detecting elements 7 and switch 8 are electrically connected to an electronic circuit (not illustrated) of the device through the wiring patterns or the like.

In above constitution, a plurality of menus including a name and a song title, and a cursor or the like (not illustrated) are displayed on a display (not illustrated) of the device which is composed of such as liquid crystal display or the like. In this status, a user turns an upper part of ball 1 with a finger, then magnet 2 embedded in the periphery of ball 1 moves with it. If ball 1 is turned in a right direction, magnet 2A first comes close to magnetic detecting element 7, and then magnet 2B comes close to magnetic detecting element 7.

Magnetic detecting element 7 detects magnetism of the plurality of magnets 2 alternately coming close and leaving out, and outputs a certain pulse signal to the electronic circuit of the device. With this pulse signal, the electronic circuit of the device finds out a rotational direction and a rotational angle of ball 1, and then moves the cursor or the like on the menus displayed in the display of the device toward the right direction.

When the user turns ball 1 to a left, front, back, or intermediate diagonal direction, a pulse signal is likewise output from one or more of magnetic detecting elements 7. The electronic circuit then detects the rotational direction and the rotational angle of ball 1, and moves the cursor or the like in the left, front, back, or diagonal direction.

When the user presses the upper part of ball 1 while the cursor or the like is stayed on a desired menu, upper case 3 and lower case 4 accommodating ball 1 moves downward as shown in FIG. 8. As a result, the bottom face of lower case 4 pushes button 8A, thus electrically conducting switch 8. The electronic circuit detects the electrical conduct, fixing the menu or displaying a following menu.

Namely, a user turns ball 1 in a certain direction while watching a display of the device, then the cursor or the like displayed on the display is moved toward the direction. Thus the user may select the menu. The user may fix the menu or display a following menu by press-operating ball 11. This kind of input device is disclosed in Patent Document 1, for instance.

However, with this conventional input device, if the user mistakenly presses ball 1 while turning ball 1, ball 1 moves down with upper case 3 and lower case 4, changing the gap between ball 1 and magnetic detecting element 7. Because of it, the pulse signals output from magnetic detecting element 7 are varied, causing an error in detecting the rotational direction and the rotational angle.

Patent Document 1: Japanese Patent Unexamined Publication No. 2004-5091

SUMMARY OF THE INVENTION

This invention relates to an input device causing a no detection error and having a reliable operability. The input device of this invention includes a case, a ball, a magnetic detecting element, a wiring board, and a rocking part. The ball is accommodated in the case in a rotatable manner, exposed from an opening of the case, and is embedded with a magnetic substance having a plurality of protrusions, or with a plurality of magnets. In a case the magnetic substance is embedded in the ball, a magnet is placed in a position where it magnetically affects the plurality of protrusions. The magnetic detecting element is disposed facing the ball with a certain gap. A switch is mounted on the wiring board. The rocking part is placed between the case and the switch, so as to support the case swingably with respect to the switch. The switch is turned on and off corresponding to a rocking motion of the rocking part. The ball and the magnetic detecting element are attached to the rocking part by keeping a certain gap each other when the rocking part rocks. With this structure, the rocking part operates the switch, and the predetermined gap between the ball and the magnetic detecting element is not changed even when the device is press-operated. As a result, variation in detecting a rotational direction and a rotational angle is suppressed.

DETAILED DESCRIPTION OF PREFERRED EMBODIMENTS

Figure 1:
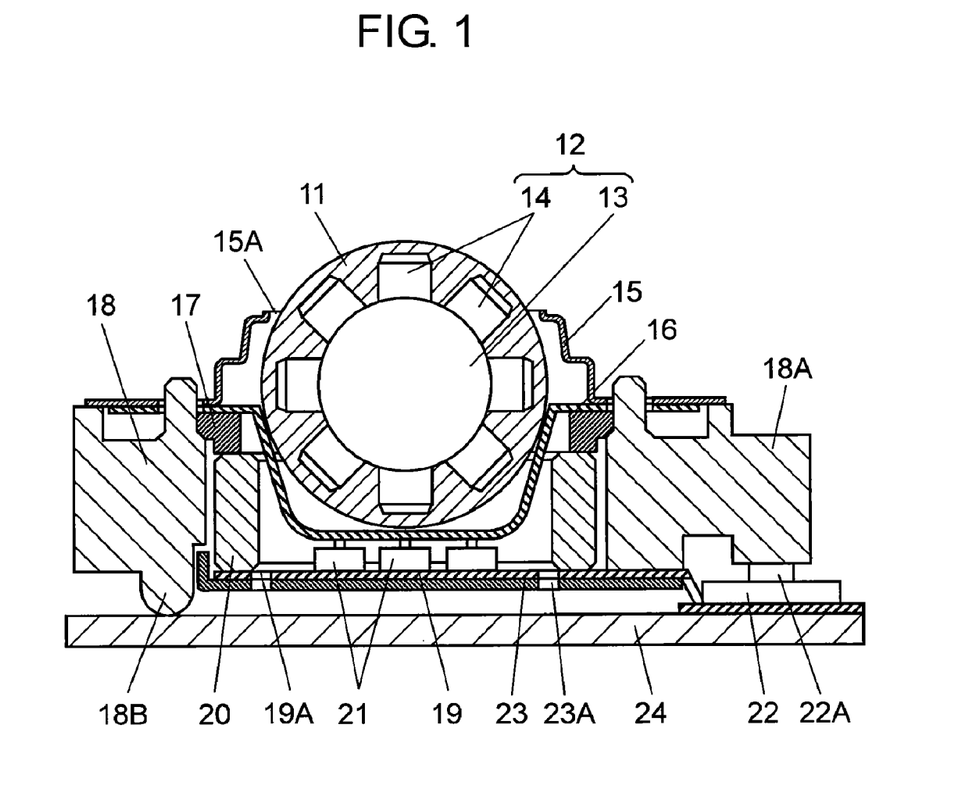
FIG. 1 is a cross sectional view of an input device according to an embodiment of the present invention.
Figure 2:
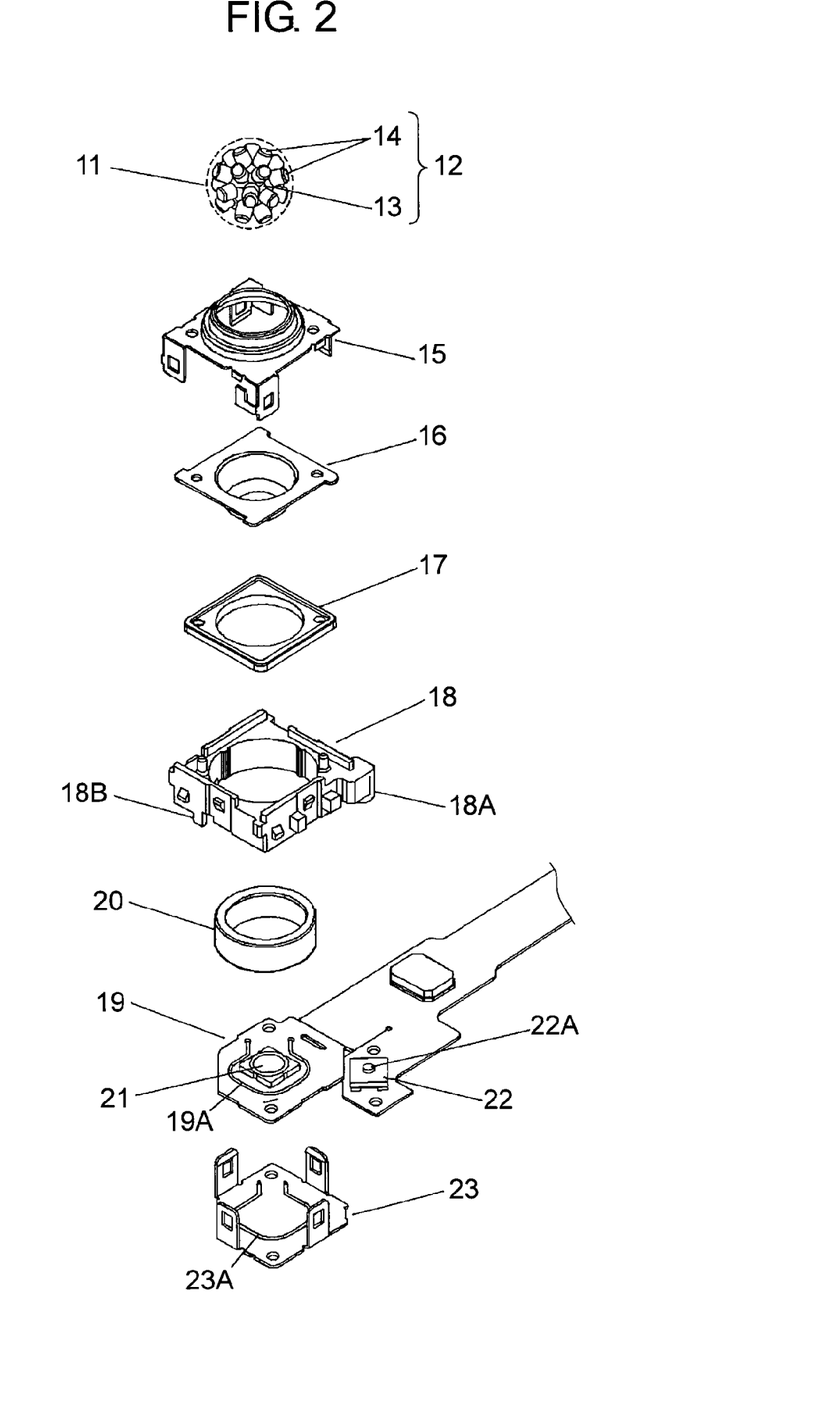
FIG. 2 is an exploded perspective view of the input device shown in FIG. 1.

FIG. 1 is a cross sectional view of an input device according to an embodiment of the present invention, and FIG. 2 is an exploded perspective view of the device. The input device includes a case composed of upper case 15 and lower case 16, ball 11, cover 17, magnet 20, flexible board 19, magnetic detecting elements 21, switch 22, frame 23, wiring board 24, and rocking part 18.

Ball 11 is rotatably accommodated in the case. Upper case 15 is provided with opening 15A and ball 11 is exposed from opening 15A. That is, an upper part of ball 11 is protruded from the opening of upper case 15. Ball 11 is embedded with magnetic substance 12 having a plurality of protrusions 14 protruded from core part 13. Magnet 20 is installed in a position where its magnetism affects protrusion 14. Magnetic detecting elements 21 are disposed facing ball 11 with a certain gap. Switch 22 is electrically connected to flexible board 19 and is mounted on wiring board 24. Rocking part 18 is placed between the case and switch 22, and supports the case in a swingable manner with respect to switch 22. Switch 22 is turned on and off in accordance with a rocking motion of part 18. The case holds the gap constant between ball 11 and magnetic detecting elements 21 with respect to the rocking motion of rocking part 18. Namely, ball 11 and magnetic detecting elements 21 are attached to rocking part 18 so as to keep the mutual gap constant with respect to the rocking motion of rocking part 18.

A body of ball 11 is made of insulating resin such as acrylonitrile butadiene styrene (ABS), polycarbonate and urethane. Magnetic substance 12 is made of permalloy, iron, Ni—Fe alloy, or the like. Magnetic substance 12 has a plurality, for instance 24, peaces of protrusions 14 in substantially a column shape radially protruded from core part 13 toward an outer periphery.

Upper case 15 and lower case 16 are made of a thin metal plate such as steel. Cover 17 is made of rubber, elastomer or the like and is formed in substantially a plate shape. Rocking part 18 is made of insulating resin such as polybutylene terephthalate and polystyrene. Upper case 15 and lower case 16 accommodating ball 11 are placed on an upper side of rocking part 18 via cover 17.

Flexible board 19 in a film shape is made of polyethylene terephthalate or polycarbonate. On an upper and a lower side of flexible board 19, a plurality of wiring patterns (not illustrated) is formed with carbon, silver, copper foil or the like. Magnet 20 has a substantial cylinder shape and is placed on the upper side of flexible board 19, surrounding ball 11 with N pole upward and S pole downward. Magnet 20 is made of ferrite, Nd—Fe—B alloy or the like.

Within an internal circumference of magnet 20 on the upper side of flexible board 19, a plurality of magnetic detecting elements 21 such as a GMR element detecting horizontal magnetism and a Hall element detecting vertical magnetism is mounted. Magnetic detecting elements 21 are disposed facing ball 11 with a certain gap. In FIG. 2, one unit represents the plurality of magnetic detecting elements 21.

Switch 22 is a push type and is mounted on a right side of flexible board 19 and is placed below ball 11. Switch 22 has push button 22A protruding upward. A bottom face of press part (operational part) 18A in a right side of rocking part 18 is in contact with an upper face of push button 22A. Switch 22 may be mounted on wiring board 24.

Frame 23 is made of a metal thin plate such as a steel plate. Frame 23 covers underside of flexible board 19 and is fixed to upper case 15. With this structure, ball 11 accommodated in lower case 16, magnetic detecting elements 21 mounted on flexible board 19 and rocking part 18 placed in-between them are held in a determined position. Magnetic detecting elements 21 are preferably placed so as to elastically contact lower case 16.

Wiring board 24 is made of paper phenol, glass epoxy or the like. On an upper and a lower side of wiring board 24, multiple wiring patterns (not illustrated) are formed with carbon, copper foil and the like. A lower side of fulcrum part 18B at a left side of rocking part 18 is in contact with an upper surface of wiring board 24. In FIG. 2, wiring board 24 is not shown. The input device is thus constituted.

Thus constituted input device is installed in an operational part (not illustrated) of an electronic device such as a mobile phone and a personal computer, with the upper part of ball 11 protruded. Magnetic detecting elements 21 and switch 22 are electrically connected to an electronic circuit of the electronic device through the wiring patterns or the like.

Figure 3A:
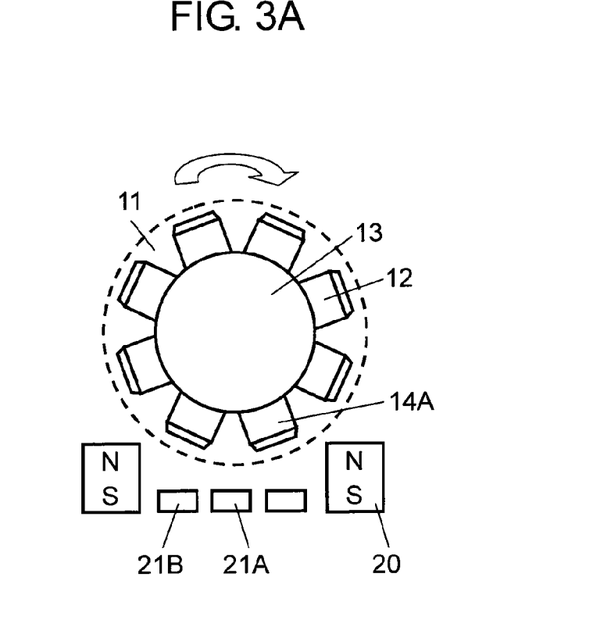
FIG. 3A is a partial front view of the input device shown in FIG. 1.
Figure 3B:
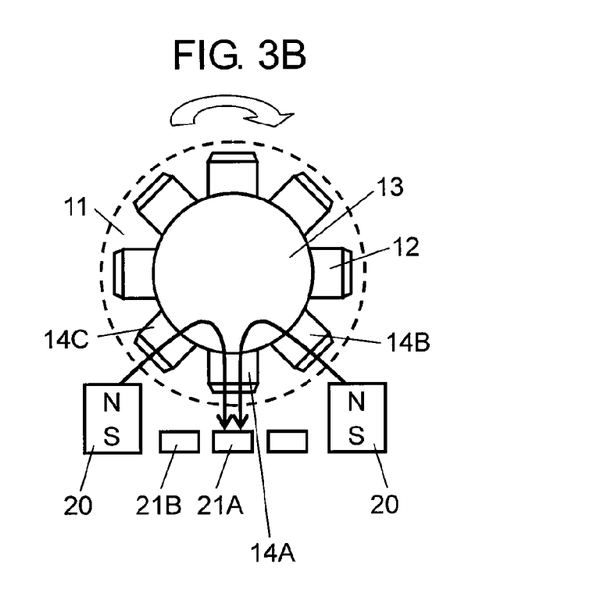
FIG. 3B is a drawing showing a flow of magnetism in FIG. 3A.
Figure 4:
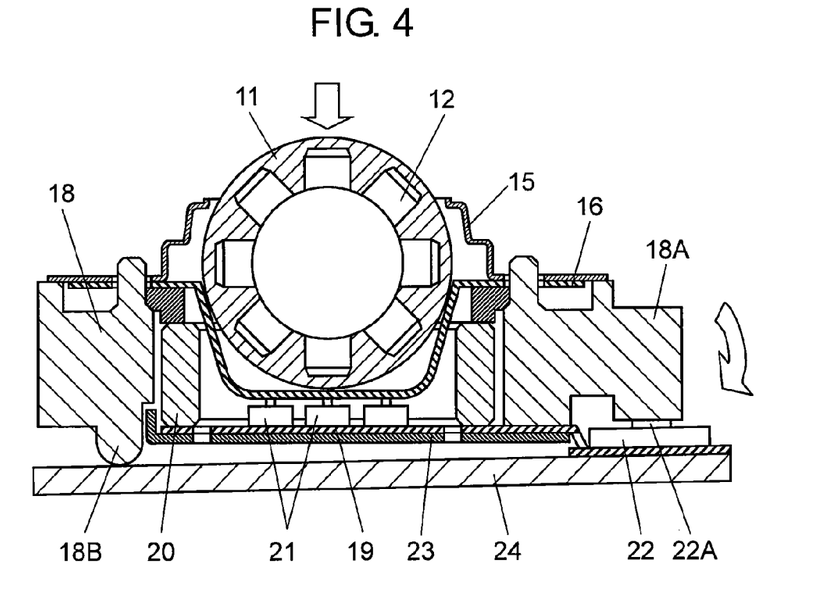
FIG. 4 is a cross sectional view of the press-operated input device shown in FIG. 1.

Next, working principle of the input device is described using FIGS. 3A to 4. FIG. 3A is a partial front view of the input device shown in FIG. 1. FIG. 3B shows flow of magnetism in FIG. 3A. FIG. 4 is a cross sectional view of the press-operated input device shown in FIG. 1.

A user turns an upper part of ball 11 with a finger when a plurality of menus such as names and song titles, and a cursor (all not illustrated) are displayed on a display of an electronic device, such as a liquid crystal display element and the like. Magnetic substance 12 embedded in ball 11 turns with the turning. If the ball is turned toward a right direction as indicated in FIG. 3A, protrusion 14A of magnetic substance 12 first comes close to magnetic detecting element 21A.

FIG. 3B shows a status where protrusion 14A comes closest to magnetic detecting element 21A. In this status, magnetism from N pole of magnet 20 placed under ball 11 from right and left sides, for instance, comes into protrusions 14B and 14C which is closest to magnet 20. The magnetism passes through core part 13 and then protrusion 14A, and magnetic detecting element 21A detects the magnetism from protrusion 14A.

If the user continues turning ball 11 in the right direction, protrusion 14A leaves magnetic detecting element 21A, moving close to magnetic detecting element 21B. Protrusion 14B then comes close to magnetic detecting element 21A, and magnetic detecting element 21A detects magnetism from protrusion 14B.

In other words, magnetic detecting element 21A detects magnetism from N pole of magnet 20 once when protrusion 14A comes closest to the element. Magnetism is then once reduced, but when next protrusion 14B comes closest, magnetic detecting element 21A detects the magnetism from N pole one more time. Each time, magnetic detecting element 21A outputs the pulse signal to an electronic circuit of a device.

Magnetic detecting element 21B disposed in palarrell with magnetic detecting element 21A also detects the magnetism from protrusion 14A and 14B. Magnetic detecting element 21B is placed slightly away from magnetic detecting element 21A by a certain distance. So, the pulse signal output from magnetic detecting element 21B is delayed by a certain period of time with respect to the pulse signal output from magnetic detecting element 21A. Namely, the pulse signal from magnetic detecting element 21B has a phase difference against the pulse signal detected by magnetic detecting element 21A.

The electronic circuit of the device detects a rotational direction of ball 11 from information which pulse signal has been raised first out of the two having a different phase. It also detects a rotational angle of ball 11 based on the number of pulses. Based on the detection results, the electronic circuit of the device moves the cursor or the like on the menus displayed on the display in the right direction, for instance.

When ball 11 is turned to a left, front, rear, or intermediate diagonal direction, pulse signals are likewise output from the plurality of magnetic detecting elements 21. Based on the output signals, the electronic circuit of the device detects a rotational direction and a rotational angle of ball 11, and moves the cursor to the left, front, rear, or the diagonal direction.

If the user presses the upper part of ball 11 while the cursor points a desired menu, rocking part 18 rocks on fulcrum part 18B serving as a fulcrum, as indicated in FIG. 4. Then, the bottom face of press part 18A in the right side pushes button 22A so as to turn switch 22 on or off. The electronic circuit of the device detects the switching status and fixes the menu or displays a following menu, for instance.

With this movement, components united to rocking part 18 with upper case 15 and frame 23, such as ball 11, lower case 16, flexible board 19 and magnetic detecting element 21 are all rocked with rocking part 18 without changing their relative positions.

Namely, the user, while watching the display of the device, may select the menu by turning ball 11 in a desired direction thereby moving the cursor or the like displayed on the display in a desired direction. By pressing ball 11, the user may fix the menu or display the following menu.

As described above, during the pressing operation, components such as ball 11 and magnetic detecting element 21 are rocked with rocking part 18. Due to this arrangement, even when the user may mistakenly pushes ball 11 while turning ball 11, relative position between ball 11 and magnetic detecting element 21 remains unchanged. Therefore, variation or an error in the pulse signals coming out from magnetic detecting element 21 is not caused.

In summary, with the input device, ball 11 is accommodated in the case, and rocking part 18 is disposed for uniting the case and magnetic detecting element 21 while keeping a distance between them constant. When ball 11 is pressed, rocking part 18 rocks and pressing part 18A operates switch 22. Accordingly, when ball 11 is pressed, the gap between ball 11 and magnetic detecting element 21 does not change. Therefore, variation in detecting the rotational direction and the rotational angle of ball 11 is suppressed and the input device is operated reliably without causing a detection error.

In the above description, magnetic substance 12 is embedded in ball 11, and magnetic detecting element 21 detects the magnetism from magnet 20 in the cylindrical shape through magnetic substance 12, thereby detecting the rotational direction and the rotational angle of ball 11. However, the present invention is not limited to this constitution. As shown in a cross sectional view in FIG. 5, a plurality of magnets 20A in substantially a column shape may be radially embedded in ball 11 instead of magnetic substance 12. As long as magnetic detecting elements 21 detect magnetism of magnets 20A, magnet 20 in substantially a cylinder shape is omitted. Thus, a less expensive input device may be obtained with the simple structure.

Figure 5:
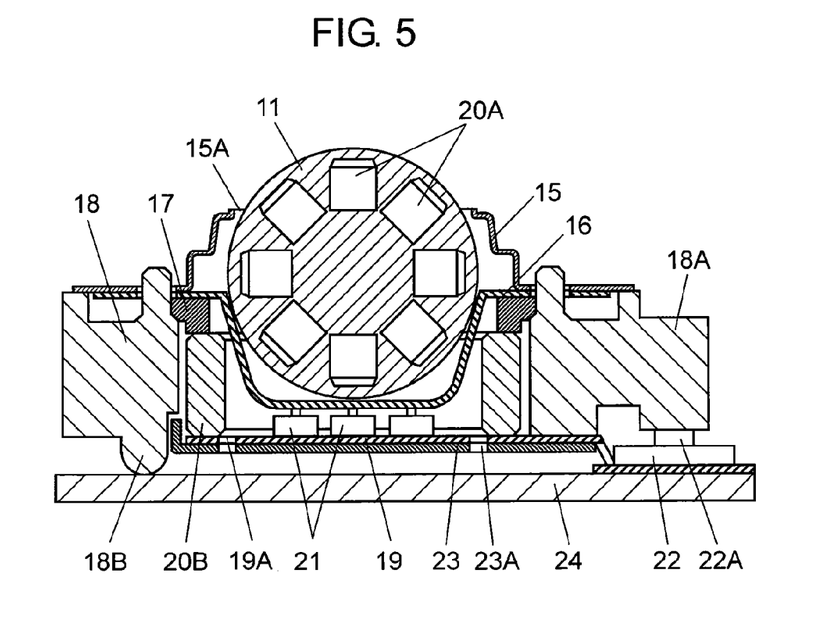
FIG. 5 is a cross sectional view of another input device according to the embodiment of the present invention.

In this particular case, resin body 20B in a similar shape as to magnet 20 is placed for holding lower case 16 with respect to flexible board 19. Alternately, as shown in FIG. 1, rocking part 18 may hold the case so that height of lower case 16 is fixed with respect to flexible board 19. Still alternately, magnetic detecting elements 21 may be affixed to an outer bottom of lower case 16. Either case, the gap between ball 11 and each of magnetic detecting elements 21 is kept constant.

In the above description, magnetic substance 12 embedded in ball 11 is composed of core part 3 in substantially a ball shape and a plurality of protrusions 14 radially extending from core part 13 toward the outer periphery. However, the present invention is not limited to this constitution. Core part 13 may be hollow. Or, a plurality of protrusions 14 may be extended toward a center of ball 11 and linked at the center, instead of having core part 13. As long as the plurality of protrusions 14 are linked, the core part may be configured in a variety of ways and the invention can be realized.

In the description, a plurality of protrusions 14 of magnetic substance 12 are described to be in substantially a column shape, but the invention can be realized by using the protrusions in a shape of quadrangular prism, polygonal column, circular cone, or pyramid shape.

In the description, switch 22 is explained to be a push switch. However, when a lever switch may be used, the invention can be realized.

Still more, as shown in FIGS. 1 and 2, notch 19A in a U shape may be formed around magnetic detecting element 21 in flexible board 19, elastically contacting with the bottom face of lower case 16, and notch 23A in a U shape at a corresponding position to notch 19A in frame 23. By forming notches 19A and 23A, even if a user presses ball 11 by mistake while turning ball 11 and thereby tilts the whole unit including rocking part 18, a region within notch 19A of flexible board 19 and a region within notch 23A of frame 23 can elastically bend. Therefore, magnetic detecting element 21 is moved up and down in a same direction as that of ball 11. The gap between magnetic detecting element 21 and ball 11 is consequently kept constant. Moreover, with this constitution, the region within notch 19A and the region within notch 23A are elastically deformed after switch 22 has been pressed by ball 11, so that switch 22 is protected. For this reason, notches 19A and 23A are preferably formed thereby magnetic detecting element 21 is elastically contacted with the bottom face of lower case 16. Meanwhile, instead of forming notches 19A and 23A, rubber or other elastic material may be placed between frame 23 and flexible board 19 so as to elastically contact magnetic detecting element 21 with the bottom face of lower case 16. This structure may be applied to the constitution in FIG. 5.

Figure 6:
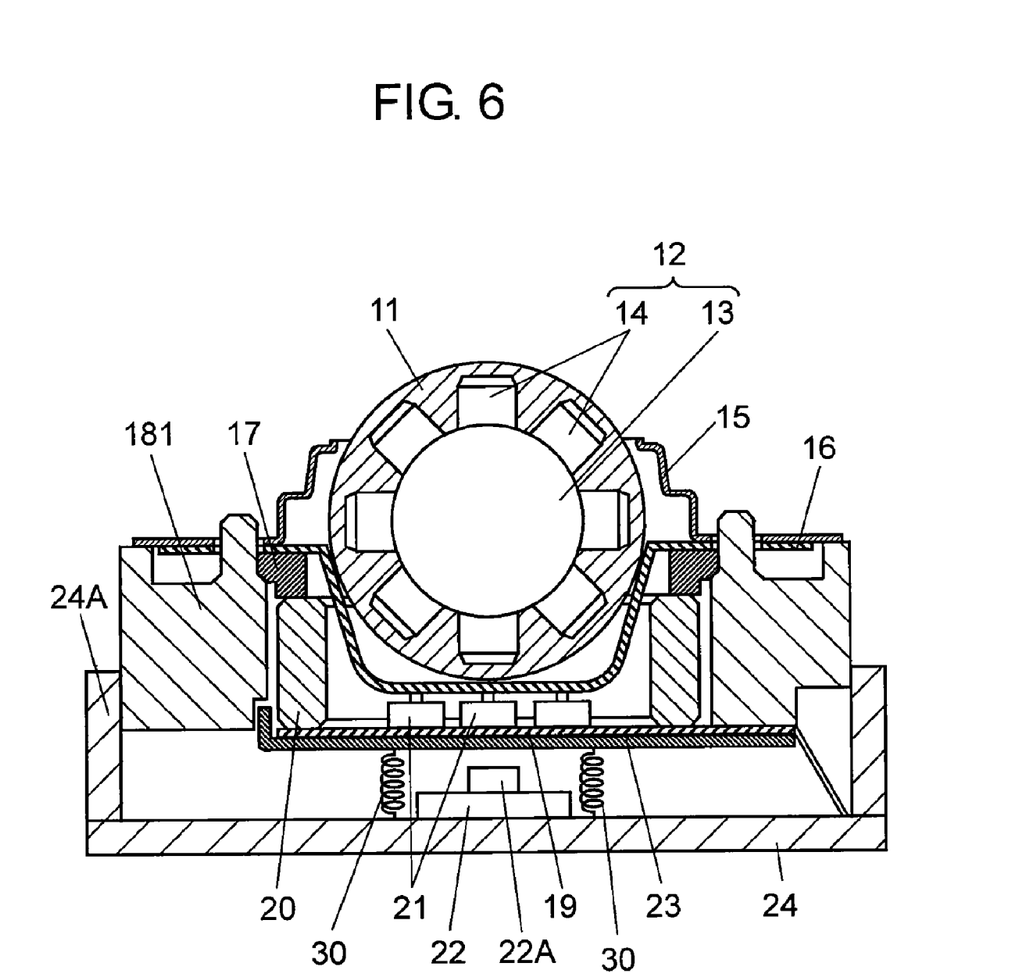
FIG. 6 is a cross sectional view of still other input device according to the embodiment of the present invention.

Next, still other input device of the embodiment of the invention is described using FIG. 6. FIG. 6 is a cross sectional view of the still other input device in accordance with an embodiment of the invention. This input device is different from that in FIG. 1 in a structure of the rocking part and a location of the switch.

In this constitution, components such as ball 11, the case, magnetic detecting elements 21, frame 23 and the like are united to rocking part 181. Spring 30 elastically supports frame 23 with respect to wiring board 24. Switch 22 is located right under ball 11, between frame 23 and wiring board 24. Wiring board 24 has guide wall 24A holding rocking part 181 movably in up and down directions.

In this structure, rocking part 181 is placed between the case and switch 22, and supports the case by spring 30 movably with respect to switch 22. In this constitution, frame 23 is an operating part of switch 22. Preferably, frame 23 is in a selected thickness and is made of selected material so that it has a higher rigidity than frame 23 in the constitution in FIG. 1.

INDUSTRIAL APPLICABILITY

The input device of the invention does not make a mistake in detection, realizing a reliable operation. With this advantageous effect, the device is useful for operating various electronic devices.

The invention claimed is:

1. An input device comprising:
   a case having an opening;
   a ball rotatably accommodated in the case, exposed from the opening, and embedded with a magnetic substance having a plurality of protrusions;
   a magnet placed at a position where magnetism thereof affects the plurality of protrusions;
   a magnetic detecting element disposed facing the ball with a certain gap;
   a switch;
   a wiring board installing the switch; and
   a rocking part placed between the case and the switch and swingably supporting the case with respect to the switch,
   wherein the switch is turned on and off corresponding to a rocking motion of the rocking part, and
   the ball and the magnetic detecting element are attached to the rocking part so that the gap therebetween is kept constant when the rocking part rocks.

2. The input device according to claim 1,
   wherein the rocking part includes a fulcrum part contacting the wiring board and an operational part operating the switch.

3. The input device according to claim 1,
   wherein the magnetic detecting element is elastically contacted with the case.

4. An input device comprising:
   a case having an opening;
   a ball rotatably accommodated in the case, exposed from the opening, and embedded with a plurality of magnets;
   a magnetic detecting element disposed facing the ball with a certain gap;
   a switch;
   a wiring board installing the switch; and
   a rocking part placed between the case and the switch and swingably supporting the case with respect to the switch,
   wherein the switch is turned on and off corresponding to a rocking motion of the rocking part, and
   the ball and the magnetic detecting element are attached to the rocking part so as the gap therebetween is kept constant when the rocking part rocks.

5. The input device according to claim 4,
   wherein the rocking part includes a fulcrum part contacting the wiring board and an operating part operating the switch.

6. The input device according to claim 4,
   wherein the magnetic detecting element is elastically contacted with the case.

\* \* \* \* \*